United States Patent [19]

Florek

[11] 4,096,690
[45] Jun. 27, 1978

[54] LOUVERED EXHAUST PORT LINER

[75] Inventor: James J. Florek, Troy, Mich.

[73] Assignee: Ford Motor Company, Dearborn, Mich.

[21] Appl. No.: 754,661

[22] Filed: Dec. 27, 1976

[51] Int. Cl.² ............................................. F01N 3/10
[52] U.S. Cl. ......................................... 60/282; 60/305
[58] Field of Search ................. 60/282, 304, 305, 306; 123/193 H

[56] References Cited

U.S. PATENT DOCUMENTS

| | | | |
|---|---|---|---|
| 2,295,436 | 9/1942 | Tendler | 60/305 |
| 3,729,937 | 5/1973 | Haddad | 60/305 |
| 3,759,040 | 9/1973 | Peltomaki | 60/305 |
| 3,984,977 | 10/1976 | Morita et al. | 60/282 |
| 4,041,916 | 8/1977 | Iida et al. | 60/282 |

*Primary Examiner*—Louis J. Casaregola
*Attorney, Agent, or Firm*—Joseph W. Malleck; Olin B. Johnson

[57] ABSTRACT

An internal combustion engine cast housing is provided with an exhaust port liner in the exhaust passage, the exhaust port liner having contact solely with the cast housing at a flange clamped about the outlet of said passage. The liner is formed of sheet metal and is provided with one or more louvers or apertures partially punched out of the mid-section of the sheet metal liner body. The metal material of said punching is hinged and bent inwardly at an angle to define an air foil or baffle for controlling mixing of exhaust gases and of secondary air admitted through said apertures and to serve as a hot surface for facilitating continued chemical reactions. Metallic seals are formed as annular protrusions from the sheet metal body to define a trapped air space about the liner body and located upstream of the louvered apertures. The emission content, and particularly the hydrocarbon content of the exhaust gases is reduced by secondary chemical conversion within the confines of said exhaust passage liner and by appropriate control of the influx of secondary air preferably during the exhaust cycle. The chemical reaction temperature within said exhaust port liner is lowered to facilitate chemical conversion, and the louvers provide a holder for stabilizing the chemical conversion front within said liner.

5 Claims, 4 Drawing Figures

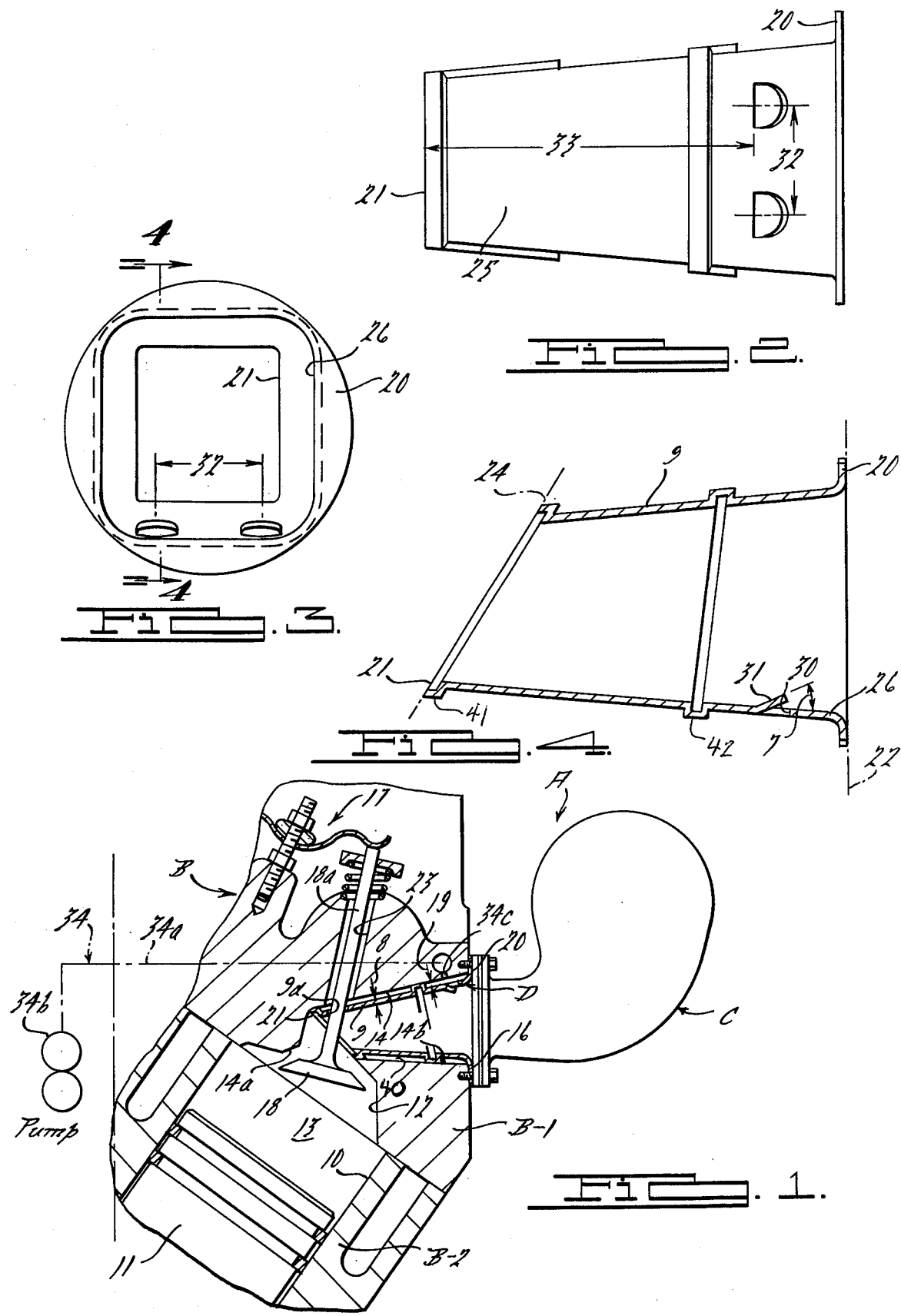

LOUVERED EXHAUST PORT LINER

BACKGROUND OF THE INVENTION

With the advent of stricter emission controls for automobiles, primary emphasis has been to effect emission clean up by way of exterior attached devices, such as thermal reactors or catalytic converters. However, it has been suggested that a degree of chemical conversion might take place within the exhaust port of a typical cast head of an internal combustion engine. To this end, some effort has been made by the prior art to conserve residual gas heat within the exhaust gas passage by preventing such heat from being extracted through the cast head into the cooling system. Residual heat is necessary to maintain a proper temperature level to effect a chemical conversion of unburned hydrocarbons and other emission compounds.

Principal difficulties of effecting satisfactory chemical conversion within the exhaust port prior to entry into the cooler exterior exhaust system are (a) the ultra-short length of the exhaust port within the head providing inadequate time dwell under normal temperature conditions to effect a satisfactory level of emission conversion, (b) emission conversion requires an excess of oxygen which is difficult to control even if a predetermined quantity of excess oxygen is introduced into the exhaust gases by controlling the air/fuel ratio and combustion process.

More importantly, the emission conversion front or flame front for carrying out the additional emission clean up in the exhaust port must be stabilized within the exhaust port itself.

A solution which solves these three problems in an economical manner is desirable in view of the state of the art.

SUMMARY OF THE INVENTION

The primary object of this invention is to provide an economical insertable device for use in the head of an internal combustion engine which promotes more efficient emission clean up prior to the conveyance of the exhaust gases into the exterior system when the engine is operating at rich air/fuel ratios (between 13.1 and 14.3).

Particular features pursuant to the above object comprise the use of (a) a heat resistant sheet metal liner adapted to be maintained in a spaced relation to the walls of the exhaust port except for an annular flange which is adapted to fit closely and in contact with the exterior terminal margin of said exhaust port; it may be desirable to seal the air space between the liner and port by inserting insulation material about the inlet end of the liner to provide a second contact or to use metal ribs for the same purpose; (b) a liner having one or more apertures for introducing secondary air at a controlled rate into the exhaust gas stream flowing through the central or trailing inner zone of said liner; (c) a liner having interior walls arranged with an air foil at the leading edge of each aperture to direct incoming secondary air and exhaust gases at a predetermined angle with respect to the wall of the liner for a gradual merging and mixture of the two flow streams, said foil being hot to act as a flame holder or stabilizer of the chemical conversion front within the exhaust port liner; (d) yet still another feature of this invention is to provide a mechanism which enables exhaust gas conversion within the exhaust gas conversion within the exhaust gas passage to take place at a lower reaction temperature.

SUMMARY OF THE DRAWINGS

FIG. 1 is a fragmentary view of a portion of an internal combustion engine head illustrating the exhaust passage and exhaust port liner of this invention shown in cross section, other components of the exhaust control port system is also illustrated in schematic outline;

FIG. 2 is an enlarged top view of the liner illustrated in FIG. 1;

FIG. 3 is an end view of the liner of FIG. 2; and

FIG. 4 is a sectional view taken substantially along line 4—4 of FIG. 3.

DETAILED DESCRIPTION

The present invention simultaneously employs a heat conserving liner and a controlled admission of secondary air to enable an engine operating with rich air/fuel ratios to obtain further emission (i.e. hydrocarbon) clean-up in the exhaust port under very efficient conditions. Internal combustion engines will be operating with rich air/fuel ratios due to the need of 3-way catalysts devices of the exterior exhaust system to reduce $NO_x$.

Turning now to the drawings, FIG. 1 schematically illustrates a fragmentary view of an internal combustion engine having a cast housing B comprised of a head B-1 and a block B-2 containing cylinders 10 within which is reciprocately operated pistons 11. In head B-1, cavities 12 are defined, each of which is aligned with one of the cylinders of the block to complete a combustion chamber 13 in conjunction with the pistons. Passages 14 are defined in the head to extend from a combustion chamber to the exterior side of the cast housing, said passages have either a typically straight centerline or if the port is curved, then the inwardly extending structure of the liner must fit within a perpendicular projection of the exhaust port exit opening to facilitate insertion of the liner. The walls defining such passages are rounded cylinders, slightly tapered, terminating at a central top portion of cavity 12. The terminal ends of said passages 14 is defined by an inlet opening 14a and an outlet opening 14b lying in a plane which is at an angle with respect to the plane of the inlet opening. The passages conduct combustion gases away from the combustion chambers into an exhaust manifold C. The housing B also has walls defining an annular machined mounting surface 16 about the exit of each passage, to which is attached a sheet metal cylindrical liner D.

The liner D employs stainless steel or other high temperature resistant sheet metal of a thickness 8 in the range of 0.05–0.10 inch. The liner is configured to have an annular flange 20 mounted against the surface 16. Liner D has an inwardly extending body structure 9 which is complimentary to the internal configuration of the passage 14. The walls of body 9 extend in a tapered fashion and are spaced from the walls of said passage a distance which is generally uniform and within the range of 0.035–0.045 inch. The inwardly extending body structure 9 of the liner terminates adjacent but spaced from the inlet opening 14a for the passage. The inlet opening 14a is controlled by an exhaust valve 18 carried upon a stem 18a which is operated in a conventional manner by a rocker arm assembly 17. The stem of the valve may extend through an opening 9a in the liner body and extends through a guide cylinder 23 in the head.

The sheet metal liner body 9 is tapered between an entrance 21 lying in a plane 24 at one end and an exit 26 defined by annular flange 20 at the other end; the flange may be joined as a separate member or bent upwardly from the material of body. The contact of the flange 20 with the mounting surface 16 may be the sole engagement between the cast head and the liner or annular ribs 41-42 may be formed to act as metal seals and additional line contact with the passage walls; the ribs serve to define a trapped air space upstream of flange 20. The ribs having a dimension of about 0.04 inch to space said liner from the port walls an equivalent distance and at the same time operate as a closure to define a trapped air space 40 upstream of the louvered apertures 30. The liner is spaced from the walls of said passage by distance 19 which is preferably about 0.04 inch. The walls of said passage are cooled by cooling water passages (not shown) and heat extraction may be further enhanced by fabricating the head of an aluminum alloy. In any event the liner is significantly important in maintaining a high heat level of the exhaust gases for chemical conversion.

One or more louvered apertures in body 9 are formed, preferably by punching out a partially circular piece hinged at one zone. These openings are used to admit secondary air; the punched piece acts as a flow foil and heat catalysts. The piece is bent inwardly at an angle to define said air foil or baffle 31. The baffle is set at a predetermined angle 7 (preferably about 30°) with respect to the wall of the liner so that the flow of exhaust gases passing over the baffle is directed inwardly and creates a slight vacuum downstream of the baffle to assist in drawing in a supply of secondary air. The exhaust gas and secondary air flows merge in a controlled manner and are thoroughly mixed. The air flow is preferably controlled to be admitted during an exhaust cycle (i.e. only when exhaust gases are flowing through the liner (thus when the exhaust valve 18 is open) by operation of control means 43 regulating conduit 34a. This insures that the liner will not be chilled by secondary air during a condition when the exhaust valve is closed.

Several of said apertures 30 may be placed equidistantly around a central section of said liner. If the apertures are not uniformly spaced about the liner, then the centerlines of said circular type apertures should be spaced apart a distance 32 (of at least 0.75 inch) with respect to the peripheral circumference of said liner body. The apertures are spaced from the inlet of said liner a predetermined distance 33 (preferably about 70% - 90%) of liner length.

Means 34 is used to carry a continuous supply of secondary air to said apertures, it typically comprises a conduit 34a in the head, a source of air pressurized by a pump 34b which may be the thermactor pump of the engine, and an injection part 34c communicating with the space about the liner immediately at the entrance to an aperture 30. Secondary air is that air which is independent from that mixed with fuel for primary combustion purposes in the combination chamber. Air is supplied at a controlled rate typically about 19 in.$^3$/min., when the engine is operational. The supply of air may be programmed in conformity with the duty cycle of the engine and most importantly only when the exhaust valves are open. Air is injected into the space about the liner and (a) sequestered into the interior of the liner by virtue of a venturi effect created at the apertures, and (b) alternatively injected into the liner by flowing through space 6 to the leading edge of the liner and through the spacing between inner edge 21 and the passage 14 (when no seal or insulation is used to trap the air in said space). Thus, air enters the interior of the liner primarily through the apertures, but may also enter about the leading edge of the liner; a more uniform and distributed secondary air injection is provided when both entrances are utilized employing a greater length and volume of the passage 14 for chemical conversion, but chemical conversion is instantaneous upon mixing with the right temperature conditions that the trailing position of FIG. 1 is preferred.

Baffle 31 serves another important function. Since the chemical conversion with the liner will take place almost instantaneously upon mixing of the secondary air with the hot gases, heat released from the chemical conversion and heat from the impinging exhaust gases causes the baffle to become cherry red and function as a catalyst surface or igniter for continuing chemical conversion. The hot baffle stablizes the chemical conversion to the hottest central zone of the liner thereby insuring action at an optimum high temperature zone of the liner. The right combination of high temperature and excess oxygen must be present for adequate secondary chemical conversion.

In a conventional exhaust port, and without the application of any secondary air, the exhaust gas temperature will vary from 725° (at idle) to 1265° F at 1700 rpm. The typical hydrocarbon content measured immediately at the outlet of the exhaust port is typically about 1400 ppm at idle when operating with an air/fuel ratio of about 16 or richer, a spark advance of 20° (before top dead center) and no exhaust gas recirculation. When secondary air is injected into a liner according to this invention and disposed in spaced relationship as defined heretobefore and with the air supplied at said controlled rate (the engine operating at rich air/fuel ratios 13.1-14.3), the hydrocarbon content of emissions can be reduced to less than 1200 ppm at idle and reduce hydrocarbons 24-75% at all other engine speeds. The exhaust gas temperature is increased from 785° at idle to 1420° F at 1700 rpm.

The advantages flowing from said construction comprise (a) the reduction of the load on the normal air injection pump due to the venturi effect of said louvers, (b) the lowering of the average chemical reaction temperature within the exhaust port liner due to a uniform injection of excess air, and (c) a lowering of the operative demands placed upon external exhaust system devices such as a catalytic converter or thermal reactor so that they may in turn operate more efficiently.

I claim:

1. In an internal combustion engine having a cast housing containing at least one combustion chamber and at least one passage effective to conduct combusted gases from said chamber, said passage having cylindrical walls extending between an entrance and an exit, the combination comprising:
    (a) walls defining an annular mounting surface about the exit of said passage,
    (b) a unitary sheet metal cylinder having an annular flange effective to be mounted against said surface, said cylinder having a body extending from said flange into and through said passage terminating adjacent said inlet, said body being spaced from said passage a distance of at least 0.035 inch except for the flange contact, said cylinder having one or more apertures therein and an integral baffle bent inwardly at the leading edge of each aperture, said baffle extending inwardly from the wall of said cylinder at an angle of about 30° and in the direction of the passage exit, said baffle acting as an air foil whereby the exhaust gases and the incoming secondary air are both directed at an inward angle with respect to the cylinder wall for proper mixing, and said baffle acting as a flame holder for sustaining secondary combustion, said apertures being spaced a distance from the inlet edge of said cylinder at least 70% of the length of said cylinder, and (c) means effective to convey a continuous supply of secondary air to said aperture at a controlled rate, whereby air is drawn into and mixed with said exhaust gas to facilitate chemical conversion of certain exhaust gas constituents by the retention of heat in said gases within said liner and by the presence of a controlled amount of excess oxygen.

2. The combination as in claim 1, in which said cylinder is tapered in conformity with the taper of said exhaust passage, and said apertures are spaced apart a lateral distance of at least 0.75 inch.

3. The method as in claim 4, in which the rate of supply of secondary air to said apertures is at least 0.19 cu.$^3$/sec.

4. A method of reducing hydrocarbon in the exhaust gas of an internal combustion engine prior to leaving said engine, said engine having walls defining an exhaust port and an exhaust valve controlling said port, comprising:

(a) arranging and operating said engine at an air/fuel ratio being 13.1–14.3, (b) insulating the exhaust port by employing a heat resistant sheet metal liner conforming to the shape of said port but spaced therefrom a uniform distance about 0.04 inch except at points of sealing with said exhaust port walls, said liner having an entrance and an exit opening, (c) placing one or more apertures in said liner at a location adjacent the exit of said liner and no further away from said exit than 30% of the length of said port, each said apertures having an area no greater than 5% of the area of said inlet opening, (d) forming a baffle at the leading edge of each said apertures extending inwardly of said liner at an included angle of about 30°, and (e) introducing secondary air to said apertures only when said exhaust valve is open, whereby the temperature of said exhaust gases will be increased and the hydrocarbon emission content at said exhaust port exit will be decreased 15°–65° over an unlined port without secondary air, depending on the speed of said engine.

5. The method as in claim 4, in which said insulation step is carried out by use of sheet metal in said liner comprised of stainless steel and having a thickness in the range of 0.05–0.10 inches, and said liner having a pair of annular ribs defining a trapped air space in conjunction with said port upstream of said apertures.

* * * * *